L. M. GARDINER.
FARM TRACTOR.
APPLICATION FILED NOV. 4, 1918.

1,409,165.

Patented Mar. 14, 1922.
4 SHEETS—SHEET 1.

Witnesses
E. R. Ruppert.

Inventor
Lou M. Gardiner
By Victor J. Evans
Attorney

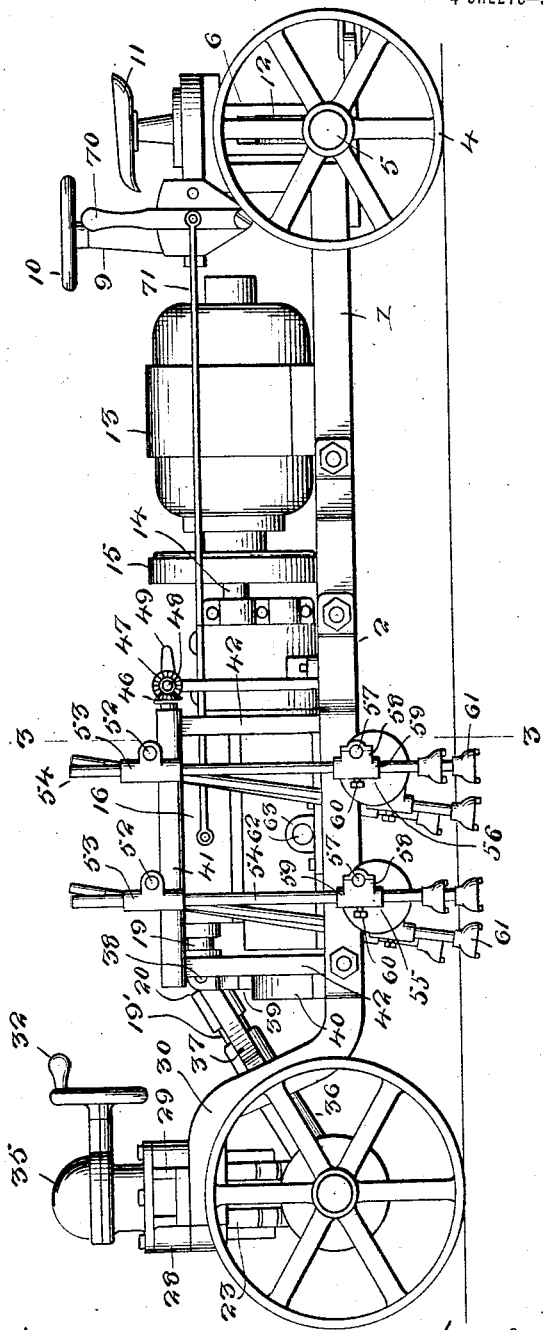

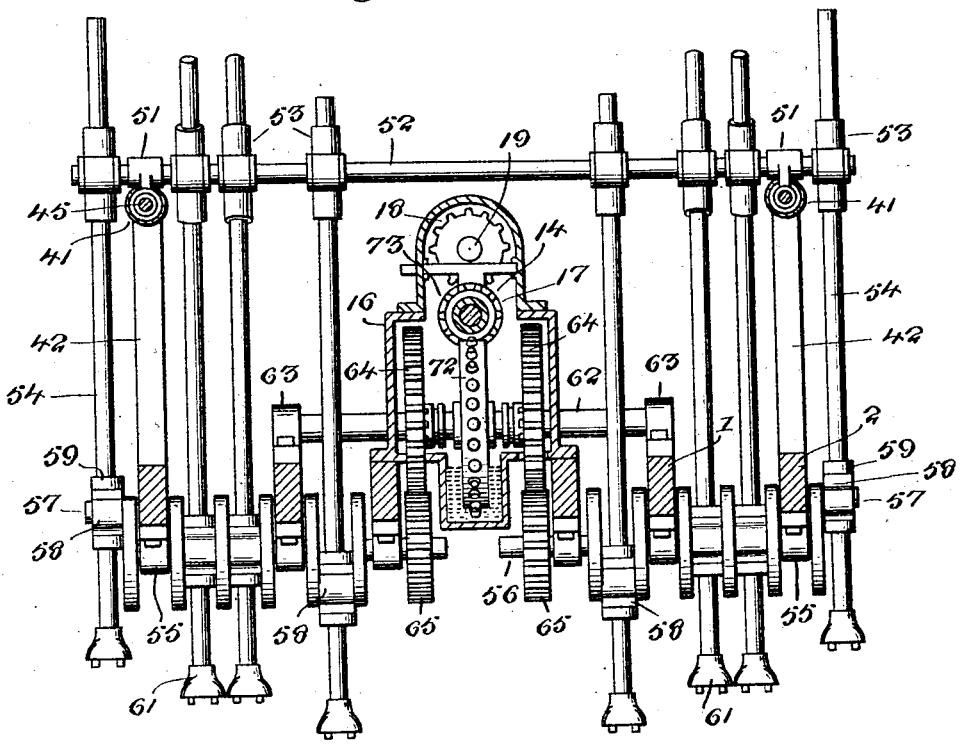
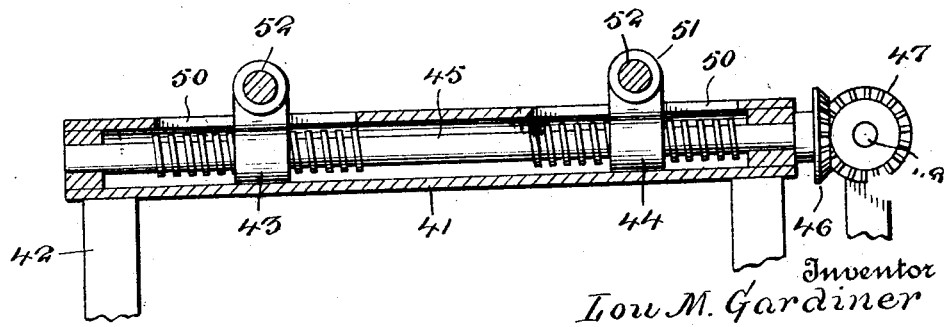

L. M. GARDINER.
FARM TRACTOR.
APPLICATION FILED NOV. 4, 1918.
1,409,165.
Patented Mar. 14, 1922.
4 SHEETS—SHEET 4.
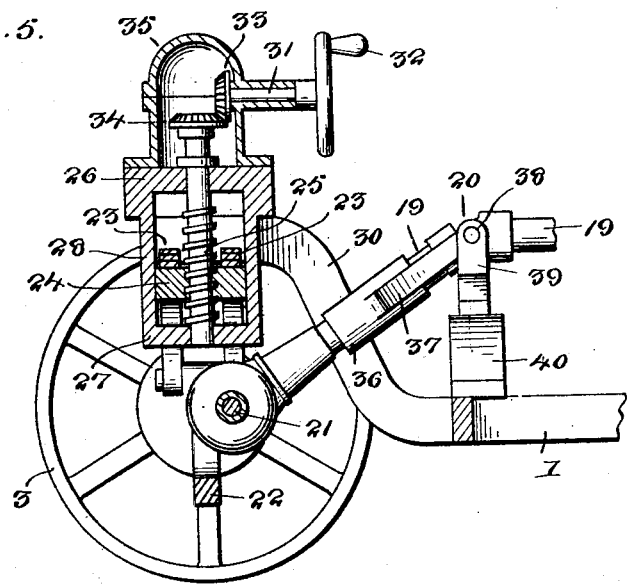
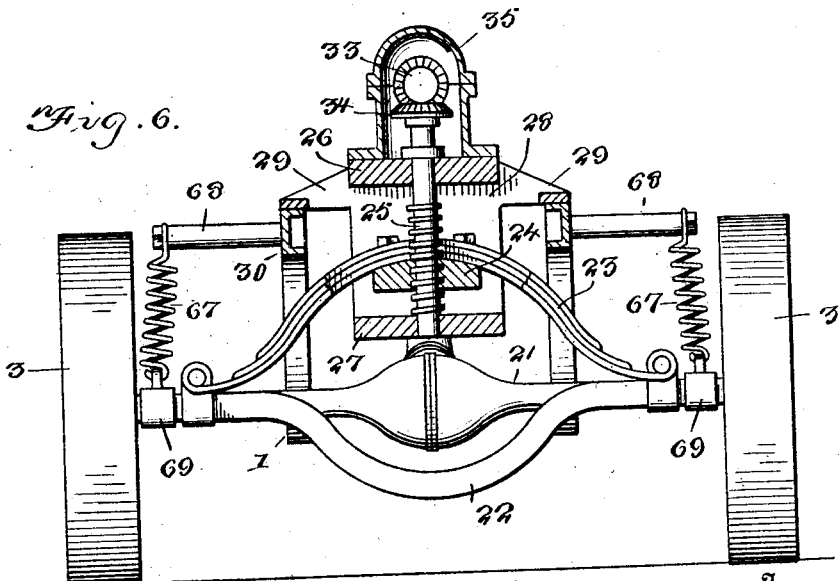
Witnesses
E. R. Ruppert
Inventor
Lou M. Gardiner
By Victor J. Evans
Attorney

UNITED STATES PATENT OFFICE.

LOU M. GARDINER, OF SAN FRANCISCO, CALIFORNIA, ASSIGNOR TO THE IRON HORSE TRACTOR COMPANY, A CORPORATION OF DELAWARE.

FARM TRACTOR.

1,409,165.   Specification of Letters Patent.   Patented Mar. 14, 1922.

Application filed November 4, 1918. Serial No. 261,012.

*To all whom it may concern:*

Be it known that I, LOU M. GARDINER, a citizen of the United States, residing at San Francisco, in the county of San Francisco and State of California, have invented new and useful Improvements in Farm Tractors, of which the following is a specification.

This invention relates to tractors, and particularly to farm tractors, the machine being especially adapted for all kinds of work on and about farms.

One of the principal objects of the invention is to produce a combined walking and wheeled tractor, the construction of which enables either method of propulsion to be used according to varying conditions in the soil and road bed. By using the walking traction means for propelling the machine, the latter may be propelled over the ground, with little or no packing effect on the soil, at the same time obtaining the necessary traction for propulsion purposes in soil so loose that an ordinary wheeled tractor could not operate. The walking or propelling legs hereinafter fully described are used to break up or puncture the subsoil to a greater or lesser degree according to the work performed and the nature of the crop to be planted and raised, while the traction wheels may be used where the ground or soil is hard, the wheeled traction means being particularly useful in traveling over the roadways to and from the field to be plowed or cultivated.

A further object of the invention is to provide means whereby the pitch or working angles of the traction legs may be varied to suit different soil conditions.

Another object in view is to provide means whereby the machine, embodying the features above set forth, may be adapted for side hill work, either for plowing or ditching.

A further object of the invention is to provide traction leg propelling means capable of being adapted for use in cultivating corn, beets, cotton, and all cultivated vegetation.

Another object in view is to provide a tractor of the general character above referred to, in which the wheeled traction means of the traction legs may be either concurrently or independently brought into use, and by means of which either traction means may be incidentally thrown into and out of use at any time required.

By means of the construction herein shown and described, the plow pan may be punctured or broken up, thereby aerating and fertilizing the subsoil and forming moisture holding or retaining pockets. This enables a full crop of vegetation to be obtained with a greatly reduced rainfall as compared with the ordinary well known method of cultivation. By means of the construction hereinafter described, greater traction is obtained in actual field work, and the soil is not packed, but on the contrary loosened so as to obtain nutriment from the soil which ordinarily underlies the plow pan.

With the above and other objects in view, the invention consists in the novel construction, combination and arrangement herein fully described, illustrated and claimed.

In the accompanying drawings:

Figure 2 is a side elevation of the same.

Figure 3 is an enlarged vertical cross section on the line 3—3 of Figure 2.

Figure 4 is an enlarged fragmental vertical longitudinal section on the line 4—4 of Figure 1.

Figure 5 is a fragmental vertical fore and aft section illustrating the frame raising and lowering means.

Figure 6 is a vertical transverse section of the same.

Figure 1:
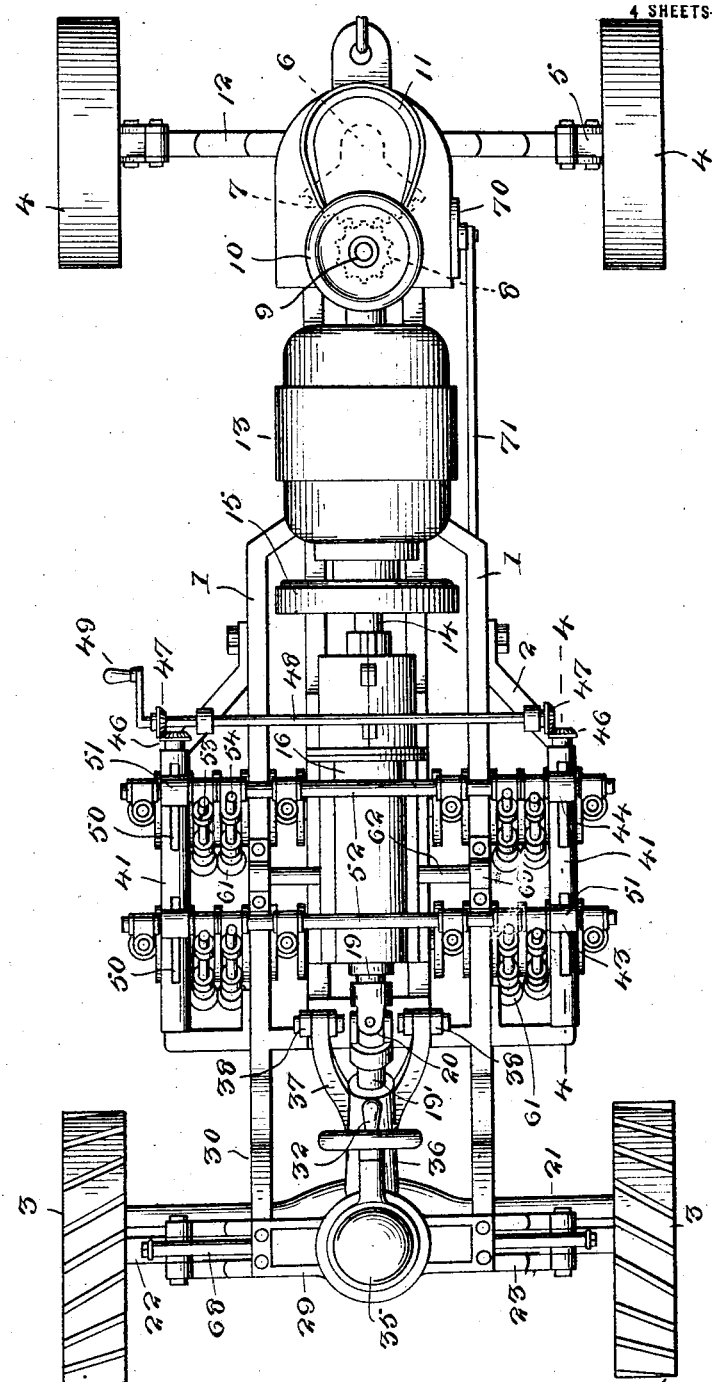
Figure 1 is a plan view of the tractor.

The frame of the tractor comprises the main longitudinal members 1, which may be connected by suitable cross members. The main frame also comprises oppositely arranged laterally off set frame members 2, the latter being in spaced relation to the frame members 1, as best illustrated in the plan view, Figure 1. 3 designates the front traction wheels and 4 the rear steering wheels, the latter being mounted upon the rear axle 5, which is adapted to turn on a substantially vertical king post 6 and is actuated for steering movement by means of a sector gear 7, which meshes with and is adapted to be actuated by a gear 8 on a substantially vertical steering shaft 9 provided at the top thereof with a hand wheel 10, in rear of which is located the operator's seat 11. 12 designates the rear frame supporting spring, which is centrally connected to the frame and connected at its opposite ends to the axle 5.

The rear axle 5 and the spring 12 are disposed in the illustrated bifurcation of the king post 6, and the spring 12 is connected to the frame through the medium of the king post 6.

The motor or engine designated at 13 is mounted upon the machine frame and the shaft 14 thereof has a fly wheel 15 fast thereon. The shaft 14 extends forwardly into the housing 16 of the transmission gearing and has fast thereon a gear 17 which meshes with the superimposed speed reducing gear on a drive shaft 19, also journaled within the housing 16 or an extension thereof. The shaft 19 which is driven at a lower speed than the shaft 14, extends forwardly and is provided in front of the housing 16 with a universal joint 20, the forward section of said shaft 19, in advance of the universal joint 20 inclining downwardly, as shown in Figure 2 and being geared to the front driving axles or shafts 21, the latter being in turn geared to the front traction wheels 3 by reduction gears, as indicated by the position of the axle or shaft 21 in Figure 2, in relation to the center of the front driving wheel 3 therein shown. The wheels 3 are mounted upon a main front axle 22, which is best shown in Figure 6, and the load thereon is yieldingly supported by means of a front frame supporting spring 23, connected at its opposite ends to the axle and fastened at the center point to the vertically adjustable bolster 24, having a centrally threaded bore to receive a vertical adjusting screw 25. The adjusting screw 25 is journaled at points above and below the spring 23 in the upper and lower portions 26 and 27 of a head member or guide 28, the latter being provided with oppositely extending lugs or arms 29 fastened to the forwardly elevated portions 30 of the main longitudinal frame members 1. The means for rotating the screw 25 is shown as consisting of a countershaft 31, having an operating crank or handle 32 thereon and connected by gears 33 and 34 with said adjusting screw 25, as shown in Figure 5. The head 28 serves as a guide for the vertically adjustable bolster 24 and is surmounted by a housing 35 which encloses the gears 33 and 34 and also forms bearings for the shaft 31 and the upper portion of the screw 25.

Manifestly the described connection of the frame with the forward portion of the spring 23 permits of lateral canting or tilting of the forward portion of the frame against the action of one or the other of the supplemental retractile springs 67 hereinafter described.

The forward extension 19′ of the driving shaft 19 is journaled in a bearing 36 carried by a forked yoke 37, which is connected by oppositely located pivots 38 to a supporting stand 39, which is also forked as shown to provide clearance for the universal joint 20. The supporting stand 39 is fixedly secured to and extends forwardly from a bracket 40, fastened to the main frame.

By the mechanism herein above described, motion is transmitted from the motor or engine to the front traction wheels, which forms one of the propelling means of the tractor when used on hard road surfaces, said propelling means being ordinarily employed for driving the tractor to and from the field of operation. The steering is effected by the mechanism described in conjunction with the rear axle and its wheels.

I have also described the means for raising and lowering the forward end of the main frame of the machine, together with all parts mounted upon said frame. The raising and lowering means are provided mainly for the purpose of throwing the other propelling or other traction means into and out of operation, which other propelling means will now be described.

Located at opposite sides of the machine and immediately above the laterally offset frame members 2 are supporting beams 41, which extend in fore and aft direction and are fixedly supported in place by means of uprights 42, extending upwardly from the frame members 2. The beams or frame members 41 are of tubular formation, one of said frame members being illustrated in detail in Figure 4. Each of said frame members 41 contains front and rear runners 43 and 44, respectively, each of said runners being movable longitudinally in and of the frame member 41, the latter acting as a guide for said runners. Extending longitudinally through each tubular housing or frame member 41, is a rotatable feed screw 45, having at the rear end thereof a gear 46, the gears 46 of the two feed screws 45 being in mesh with gears 47 on a transversely extending countershaft 48, having means for rotating the latter, said means being shown in the form of a hand crank 49. It will, of course, be apparent, however, that motion may be imparted to the shaft 48 by any means located at any desired point on the machine. By operating the shaft 48 the feed screws 45 are simultaneously operated, said screws serving to shift the runners 43 and 44 forwardly or rearwardly according to the direction in which the feed screws 45 are turned. The runners 43 and 44 extend upwardly through and work in slots 50 in the frame members or housings 41, and are provided with bearings 51, which have a pair of transversely extending guide supporting shafts or rods 52 arranged in spaced relation to each other and each having mounted loosely thereon a plurality of oscillatory guides 53, which slidingly receive the upper end portions of corresponding members of traction or propelling legs 54. Mounted for rotation in bearings 55ᵃ on the machine frame are crank shafts 55 and 56 arranged in pairs, one pair in advance of the other, each of the shafts being provided with a plurality of cranks 57, and each crank having pivotally mounted thereon a leg bearing member 58, comprising a sleeve-like leg holding portion 59, through which the respective leg 54 is inserted, and in which said leg is held and rendered vertically adjustable by means of a screw, 60, as shown in Figure 2. It will now be seen as the crank shafts 55 and 56 are rotated, the lower end portions of the traction legs 54 are caused to describe approximately circular paths, so as to engage and disengage the soil or ground over which the machine is being operated. At this point it should be noted that incidental to the movement of the pivotal connection of each leg-bearing member 58 through the lower half of a circle, the leg 54 complementary thereto is moved into and withdrawn from the ground; also, that said semi-circular movement is attended by forward traverse of the tractor, with the result that the down and up movements of the leg 54 are perpendicular to the ground, and there is no kicking action on the part of the leg 54 against the ground. On the other hand each leg 54 after being moved perpendicularly endwise into the ground, reacts laterally in a rearward direction on the ground and affords ample purchase and in that way contributes materially to the traction capacity of the leg as the machine is moved forwardly and catches up with the embedded leg, as it were, and then the leg is withdrawn endwise and perpendicularly from the ground. Detachable and interchangeable hoofs 61 are preferably though not necessarily applied to the lower extremities of the traction legs 54, and it will be apparent that the hoofs 61 may be of any size and of various shapes according to the soil being operated upon and the depth of penetration required to penetrate the soil, to break through and puncture the sub-soil below the plow pan.

By adjusting the traction legs 54 upwardly and downwardly in relation to the bearing members 58, the depth of penetration may be changed. It will also be observed that by adjusting the shafts or rods 52 forwardly or rearwardly, the pitch or working angle of the traction legs may be varied in accordance with soil or other conditions, such as when ascending or descending a grade, or for side hill work in plow ditching and the like, the traction legs on the lower side may be adjusted downwardly, while the traction legs on the upper side may be elevated. This enables the frame of the machine, and all mechanism carried thereby, to be maintained in a substantially horizontal plane. Ordinarily when the machine is being propelled by the traction legs, the traction wheels 3 will not be used, but it will be observed, by reason of the construction and arrangement described, that said traction wheels may be concurrently used if required.

Motion is imparted to the crank shafts 55 and 56, by means of leg driving shafts 62, mounted in bearings 63 on the machine frame at a higher elevation than the crank shafts 55 and 56 and geared to the latter by means of gears 64 and 65. The crank shafts 55 and 56 at opposite sides of the center may be driven independently by means of the gears 65, there being one gear 65 for each of the crank shafts. This enables the tractor legs at one side of the machine to be operated independently of those at the opposite end of the machine. This renders it easy to steer the machine and make a very short turn, practically a right angle turn, which is important, for example, at the end of a row of plants being cultivated. 67 designates the before mentioned, supplemental oppositely arranged side shock absorbing and cushioning springs, the upper ends of which are attached to laterally projecting arms 68 of the machine frame, and the lower ends of which are attached to the axle 22 by collars 69, or equivalent means. 70 designates a gear shifting lever, from which an operating rod 71 extends to the gear shifting mechanism not shown, but enclosed by the housing 16 above referred to. The shafts 62 are actuated by a gear 72 which meshes with a worm 73 on the engine shaft 14, as shown in Figure 3; the shafts 62 being preferably clutched to the gear 72, as indicated by 75, so that either or both of said shafts 62 may be driven at the desire of the operator.

From the foregoing description taken in connection with the accompanying drawings, it will now be seen that either the traction wheels 3, or the traction legs 54, may be employed for propelling the tractor, and that said traction members may be concurrently used, if so desired. Ordinarily the tractor will be driven to and from the field upon the traction wheels 3. Ordinarily also in field work, such as plowing and cultivating, the frame of the tractor will be lowered to the position shown in Figure 2, so that the tractor will operate under the power of the traction legs alone, at which time the traction wheels 3 will be elevated clear of the ground. Should an emergency require, the wheels 3 may be quickly brought into use so that both traction means may be employed to extricate the machine. For example from a difficult position, by using the traction legs 54, the sub-soil is broken and the plow pan is punctured or indented, thereby forming moisture retaining buckets in the plow pan and rendering it practicable to produce a full crop with a material reduction in the normal rain fall. For straddle row work the intermediate traction legs on opposite sides of the machine may be removed, leaving only sufficient traction legs to operate on opposite sides of two or three adjacent rows. The traction legs obtain a better hold and traction upon said ground than is possible with traction wheels and they serve to puncture and properly cultivate the soil and sub-soil rather than pack the same as is the case with tractors employing wheels. By sub-soiling the plow pan, aeration and fertilization of the soil are produced.

Having described the invention, what is claimed is:

1. A tractor embodying a frame, a motor thereon, traction wheels, traction legs each mounted for oscillatory movement in a fore and aft direction to swing forwardly and rearwardly of a vertical line and adapted to puncture the plow pan during such oscillatory movement, a crank shaft driven by said motor, and leg bearing members journaled on said crank shaft and having rigid sleeve portions through which said legs are adjustable to regulate the depth of penetration of the legs.

2. A tractor embodying a frame, a motor thereon, traction wheels, traction legs each mounted for oscillatory movement in a fore and aft direction to swing forwardly and rearwardly of a vertical line and adapted to puncture the plow pan during such oscillatory movement, a crank shaft driven by said motor, and leg bearing members journaled on said crank shaft and having rigid sleeve portions through which said legs are adjustable to regulate the depth of penetration of the legs, and oscillatory guiding sleeves for said legs above said crank shaft.

3. A tractor embodying a frame, a motor thereon, traction wheels, traction legs each mounted for oscillatory movement in a fore and aft direction to swing forwardly and rearwardly of a vertical line and adapted to puncture the plow pan during such oscillatory movement, a crank shaft driven by said motor, and leg bearing members journaled on said crank shaft and having rigid sleeve portions through which said legs are adjustable to regulate the depth of penetration of the legs, and oscillatory guiding sleeves for said legs above said crank shaft, and means for shifting said guiding sleeves in a fore and aft direction to vary the mean angle of thrust of the legs.

4. In a tractor, the combination of a wheeled frame, and walking ground-engaging means carried by the frame, the said means including a support, oscillatory guides mounted to swing about the same, a shaft located in a horizontal plane below that of the support and provided with cranks, and ground-engaging legs movable endwise in the oscillatory guides and connected with and movable by the cranks.

5. In a tractor, the combination of a wheeled frame, and walking ground-engaging means carried by the frame, the said means including a support, oscillatory guides mounted to swing on the same, shafts arranged at opposite sides of the longitudinal center of the tractor and in a horizontal plane below that of said support and provided with cranks, ground-engaging legs movable endwise in the guides and connected with said cranks and arranged in groups separated by a longitudinal intervening space, and driving connections complementary to the shafts.

6. In a tractor, the combination of a wheeled frame, means to move the same, a support thereon, oscillatory guides on the support, reciprocatory and oscillatory traction legs movable endwise in said guides, a shaft disposed in a horizontal plane below that of said support and provided with cranks, and means connecting the traction legs and the cranks whereby incidental to the rotation of the cranks the lower portions of the traction legs are moved through circles, said movement of the lower portions of the traction legs being attended by forward movement of the tractor with the result that the tractor legs are caused to penetrate and leave the ground perpendicularly.

7. In a tractor, the combination of a frame, and walking ground-engaging means carried by the frame, the said means including a support, oscillatory guides mounted to swing about the same, a shaft located in a horizontal plane below that of the support and provided with cranks, and ground-engaging legs movable endwise in the oscillatory guides and connected with and movable by the cranks.

8. A power plant comprising a frame, power driven crank shafts journaled thereon, walking legs operated by said crank shafts, and guides for the legs, shiftable to increase or diminish the length of step of the legs.

In testimony whereof I affix my signature.

LOU M. GARDINER.